United States Patent
Hsu et al.

(10) Patent No.: US 7,765,215 B2
(45) Date of Patent: Jul. 27, 2010

(54) SYSTEM AND METHOD FOR PROVIDING A TRUSTWORTHY INVERTED INDEX TO ENABLE SEARCHING OF RECORDS

(75) Inventors: Windsor Wee Sun Hsu, San Jose, CA (US); Soumyadeb Mitra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 11/466,173

(22) Filed: Aug. 22, 2006

(65) Prior Publication Data

US 2008/0059420 A1 Mar. 6, 2008

(51) Int. Cl.
G06F 17/00 (2006.01)
G06F 17/30 (2006.01)
(52) U.S. Cl. ...................................... 707/742
(58) Field of Classification Search ............... 707/1, 707/100, 200, 3, 5, 104.1, 102
See application file for complete search history.

(56) References Cited

U.S. PATENT DOCUMENTS

| | | | | |
|---|---|---|---|---|
| 5,852,822 A | | 12/1998 | Srinivasan et al. | |
| 5,913,208 A | * | 6/1999 | Brown et al. | 707/3 |
| 6,349,308 B1 | | 2/2002 | Whang et al. | |
| 7,155,460 B2 | * | 12/2006 | McGovern et al. | 707/200 |
| 7,363,284 B1 | * | 4/2008 | Plasek et al. | 707/1 |
| 7,487,178 B2 | * | 2/2009 | Hsu et al. | 707/104.1 |
| 2002/0174355 A1 | * | 11/2002 | Rajasekaran et al. | 713/193 |
| 2004/0015909 A1 | | 1/2004 | Cho et al. | |
| 2005/0198076 A1 | | 9/2005 | Stata et al. | |
| 2006/0053157 A1 | * | 3/2006 | Pitts | 707/102 |
| 2007/0050384 A1 | * | 3/2007 | Whang et al. | 707/100 |
| 2007/0185836 A1 | * | 8/2007 | Handy-Bosma et al. | 707/3 |

* cited by examiner

*Primary Examiner*—Tony Mahmoudi
*Assistant Examiner*—Dennis Truong
(74) *Attorney, Agent, or Firm*—Samuel Kossatly; Shimokaji & Associates, P.C.

(57) ABSTRACT

A trustworthy inverted index system processes records to identify features for indexing, generates posting lists corresponding to features in a dictionary, maintains in a storage cache a tail of at least one of the posting lists to minimize random I/Os to the index, determines a desired number of the posting lists based on a desired level of insertion performance, a query performance, or a size of the storage cache, and reads a posting list corresponding to a search feature in a query to identify records that comprise the search feature. The system maps the features in the dictionary to the desired number of posting lists. The system uses a jump pointer to point from one entry to the next in the posting lists based on increasing values of entries in the posting lists.

38 Claims, 10 Drawing Sheets

SYSTEM AND METHOD FOR PROVIDING A TRUSTWORTHY INVERTED INDEX TO ENABLE SEARCHING OF RECORDS

FIELD OF THE INVENTION

The present invention generally relates to indexing records. In one aspect, the present invention pertains to a fast method of inserting records into an index. When used with Write-Once Read-Many (WORM) storage, the present invention ensures that records that have been inserted into the index cannot be modified or deleted by manipulating the index.

BACKGROUND OF THE INVENTION

Records such as electronic mail (email), financial statements, meeting memos, experimental logs, and quality assurance documents are valuable assets. Key decisions in business operations and other critical activities are based on information in these records. Consequently, these records require maintenance in a trustworthy fashion that is safe from improper destruction or modification while keeping the records readily accessible. Businesses increasingly store these records electronically, making then relatively easy to delete and modify without leaving much of a trace. Ensuring that records are readily accessible, accurate, credible, and irrefutable is particularly imperative given recent legal and regulatory trends.

As critical data are increasingly stored in electronic form, it is imperative that the critical data be stored reliably in a tamper-proof manner. Furthermore, a growing subset of electronic data (e.g., email, instant messages, drug development logs, medical records, etc.) is subject to regulations governing long-term retention and availability of the data. Recent high-profiled accountability issues at large public companies have further caused regulatory bodies such as the Securities and Exchange Commission (SEC) to tighten their regulations. A requirement in many such regulations is that data must be stored reliably in non-erasable, non-rewritable storage such that the data, once written, cannot be altered or overwritten. Such storage is commonly referred to as WORM (Write-Once Read-Many) storage as opposed to WMRM (Write-Many Read-Many) storage, which can be written many times.

However, storing records in WORM storage is inadequate to ensure that the records are trustworthy, i.e., able to provide irrefutable evidence of past events. The key issue is that critical data requires some form of organization such that all of the data relevant to an enquiry can be promptly discovered and retrieved. Scanning all of the data in a large volume of data to discover entries that are relevant to an enquiry is not practical. Instead, some form of a direct access mechanism, such as an index must be built on the data for supporting efficient access.

If an index through which a record is accessed can be suitably manipulated, the record can, for all practical purposes, be hidden or deleted, even if the record is stored in WORM storage. For example, if the index entry pointing to the record is removed or made to point to a different record, the original record becomes inaccessible. Hence, the index itself must be maintained in a trustworthy fashion.

To address the need for a trustworthy index, fossilized indexes have been developed, that are impervious to such manipulations, when maintained on WORM. One such index is the generalized hash tree that supports exact-match lookups of records based on attribute values and hence is most suitable for use with structured data. Although such indexing schemes have proven to be useful, it would be desirable to present additional improvements. Most business records such as email, memos, meeting minutes, etc., are unstructured or semi-structured. The natural query interface for these records is feature (keyword) search, where the user provides a list of features and receives a list of records that contain some or all of the features. Feature based searches are handled by an inverted index.

An inverted index (or index) comprises a dictionary of features and, for each feature, an associated posting list of record identifiers and additional metadata such as feature frequency, feature type, feature position, etc. A trustworthy inverted index requires the posting list entries for a record and a path to those entries to be durable and immutable. This required immutability may be achieved by keeping each posting list in an append-only object (e.g. block, file) in WORM storage. The index can be updated when a new record is added by appending a record identifier (ID) of the new record to the posting lists of all the features contained in the new record. However, this operation can be prohibitively slow, as each append may require a random I/O. For an exemplary set of records in which a record comprises 500 features on average and an append incurs a two msec random I/O, the index update rate could be 1 doc per second.

Conventional approaches for supporting inverted index updates amortize the cost of random I/O, by buffering the index entries of the new records in memory or disk and committing these index entries to the index in batches. Specifically, the features of newly arriving records are appended to an in-memory or on-disk log comprising <feature, record ID> pairs. This log is periodically sorted on feature to create an inverted index for the new records, which is then merged with the original inverted index. Although this technology has proven to be useful, it would be desirable to present additional improvements. Researchers have found that this strategy is effective primarily when a large number of index entries are buffered. For example, over 100,000 records might have to be buffered to achieve an index update rate of 2 records per second.

Buffering creates a time lag, about half a day for the previous example, between the time a record is created to the time the index is updated to include the record. This time lag is inconsistent with maintaining a trustworthy index. Such a time lag provides a window in which an adversary can modify the index by, for example, deleting an index entry while it is still in the buffer, crashing the indexing system and deleting the recovery logs of uncommitted posting list entries, etc.

Keeping the recovery logs on WORM storage also does not guarantee the trustworthiness of the inverted index. Scanning the entire log on every restart is inefficient, while relying on an end-of-committed-log marker is insecure. An adversary can append markers to fool the application into believing that no recovery is required.

The time lag between when a record is compiled and when an adversary may regret the existence of the record is domain-specific and has no a priori lower bound. Furthermore, any delay in committing index entries introduces unnecessary risk and complexity in the compliance process. For example, the prevailing interpretation of e-mail retention regulations is that a regulated e-mail is required to be committed as a record before it is delivered to a mailbox. Thus, generic compliance indexing should not assume any safe time window for committing index entries after returning to the invoking application. A trustworthy index should be updated online, as new records are added.

Search engines answer multi-keyword conjunctive queries (queries in which more than one of the features are required to be contained in the record) by calculating the intersection of the posting lists of the query keywords. To speed up these intersections, additional index structures such as B+ trees are typically maintained on the posting lists. An adversary can effectively conceal a record if the record can be omitted from these posting list indexes and hence such index structures must also be secured by fossilization. Researchers have shown that index structures like B+ trees cannot be fossilized easily. Hence, although B+ trees have proven to be useful in conventional setting, they cannot be directly used in a trustworthy index.

Conventional secure indexing systems, such as Merkle hash trees, authenticated dictionaries etc, have been developed for a threat model in which the data store is untrusted. Merkle hash tree lets one verify the authenticity of any tree node entry by trusting the signed hash value stored at the root node. Authenticated dictionaries support secure lookup operations for dictionary data structures. These conventional systems rely on the data owner to sign data and index entries appropriately. In our model, the all powerful adversary (for example CEO) can assume the identity of the data owner and modify the data/indexes by re-signing them. Hence, although these technologies have proven to be useful in specific threat models, they are inapplicable here.

What is therefore needed is a system, a computer program product, and an associated method for providing inverted index to enable searching of records. The trustworthy inverted index should prevent hiding or modifying of a record through modification of the inverted index. The trustworthy inverted index should be relatively inexpensive with respect to random I/Os and require no time lag between commit of a record and update of the inverted index to include the record. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for providing a trustworthy inverted index to enable searching of records.

The present system processes records (e.g. documents, images, audio objects, video objects, etc) to identify features (e.g. terms, keywords, tones, colors, shapes, etc) for indexing in the trustworthy inverted index and generates posting lists such that each of the posting lists corresponds to at least one of the identified features. The present system reduces the random I/Os required to insert records into the index, i.e. update the index, by effectively utilizing a storage cache. For this, is maps one or more features onto each posting list such that the tail block of all the posting lists fit largely in the storage cache. Examples of block size include, but are not limited to, 512 B, 4KB, 8KB, 16KB, 32KB, 64KB.

The mapping strategy is decided based on the record insertion performance, a query performance, and a size of the storage cache. In one embodiment, the present system maps multiple features that occur infrequently in the records and/or the queries onto the same posting list. In another embodiment, the features are randomly mapped onto the posting lists.

The present system searches the posting lists corresponding to a search feature in a query to identify records that contain the search feature.

The present system maintains an index structure over the posting lists for supporting faster join operation. The index structure exploits the fact that the record identifiers (IDs) in a posting list form an increasing sequence. IDs inserted into the index structure are not relocated and the path through the index structure to the ID is immutable. The index structure relies on jump pointer maintained with the index entries for supporting efficient lookup operations. To insert and ID into the index structure, the ID is inserted at a root node of the index structure. This insertion comprises a comparison between the ID and a reference ID at the root node of the index structure. If the insertion is unsuccessful, the present system repeats the insertion process at a target node in the index structure until the ID is successfully inserted into the index structure. If the target node does not exist, the present system generates a new node. In one embodiment, the index has a tree-like structure.

In one embodiment, the target node is identified based on a mathematical difference between the ID and a reference ID of the root node of the index structure. In another embodiment, the identification of the target node comprises using a logarithm of the mathematical difference between the ID and the reference ID of the root node. In yet another embodiment, the reference ID of the root node is the largest ID stored in the root node.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Record: any type of structured, unstructured, or semi-structured object comprising features that may be indexed such as, for example, e-mails, office documents, financial statements, meeting memos, experimental logs, instant messages, drug development logs, medical records, quality assurance documents, images, audio objects, video objects, multimedia objects, closed captioning, etc.

Inverted Index: An index comprising a dictionary of features and, for each feature, an associated posting list of record IDs and additional metadata such as feature frequency, feature type, feature position in the record, etc.

Trustworthy: incapable of modification or manipulation attempted in order to modify or hide a record.

Figure 1:
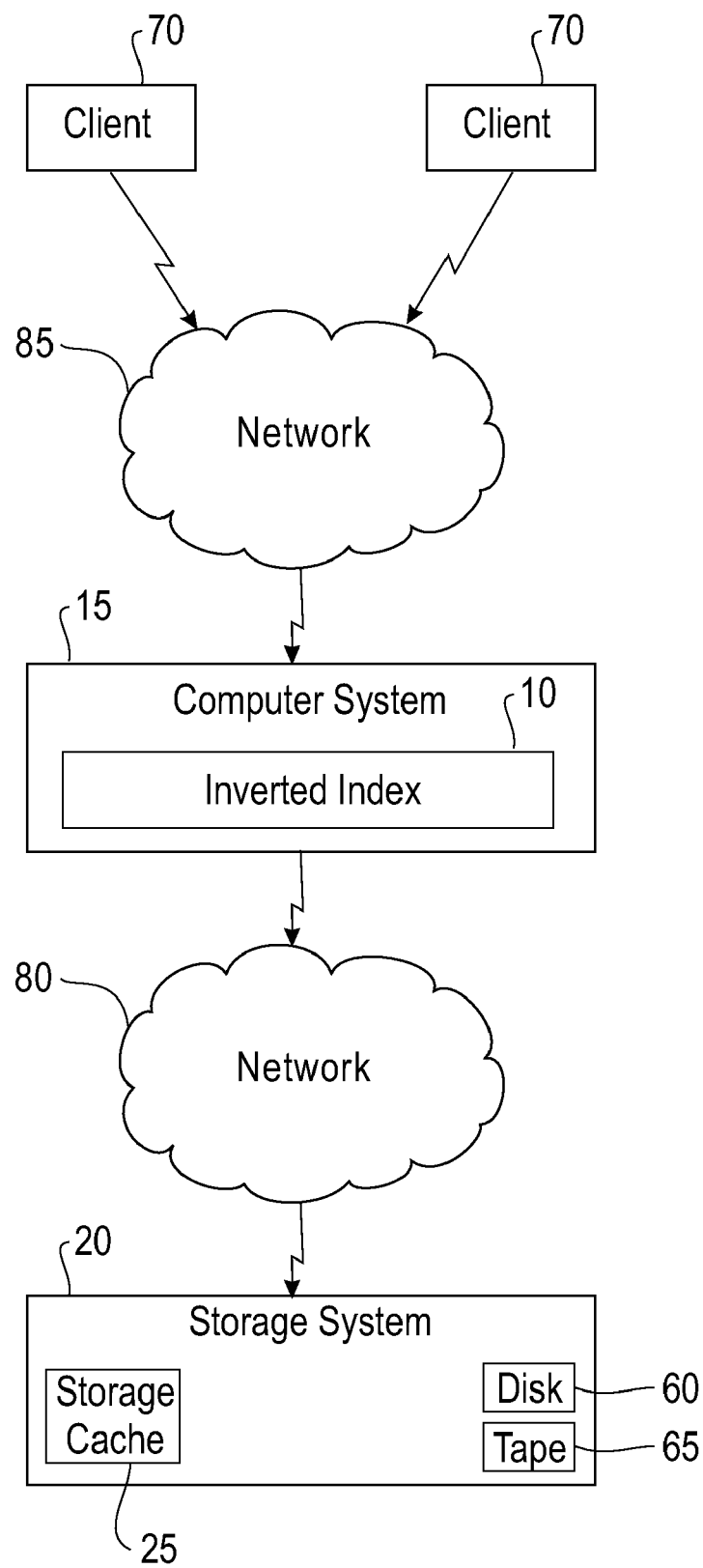
FIG. 1 is a schematic illustration of an exemplary operating environment in which an inverted index system of the present invention can be used.

FIG. 1 portrays an exemplary overall environment in which a system, a computer program product, and an associated method (the "inverted index system 10" or the "system 10") for providing a trustworthy inverted index to enable searching of records according to the present invention may be used. System 10 comprises a software programming code or a computer program product that is typically embedded within, or installed on a computer system 15. Alternatively, system 10 can be saved on a suitable storage medium such as a diskette, a CD/DVD, a hard drive, or like devices.

System 10 can take the form of an entirely hardware embodiment, an entirely software embodiment, or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include a compact disk that can be a read only memory (CD-ROM), or a read/write (CD-R/W) disk, and a DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer 15 comprises the indexing system 10 and is connected to the storage system 20. Storage system 20 comprises a storage cache 25 and storage media such as hard disks 60 and tapes 65. In one embodiment, the storage system 20 includes WORM media. Computer 15 is connected to the storage system 20 through a network 80. Clients such as clients 70 access system 10 through a network 85 or directly run on computer 15. In one embodiment, the storage cache 25 is located in computer system 15. In one embodiment, the inverted index system is located in storage system 20.

Figure 2:
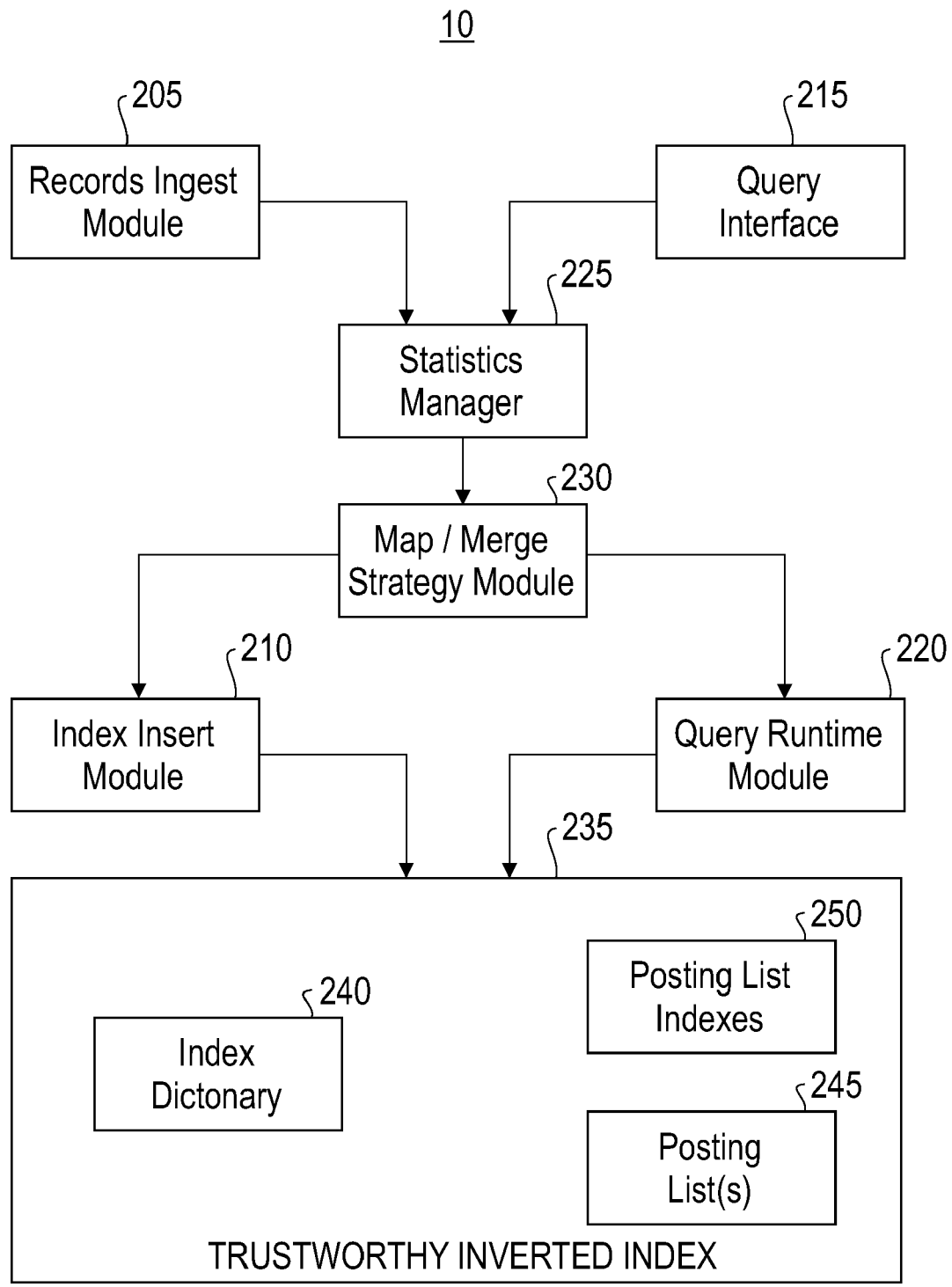
FIG. 2 is a block diagram of the high-level architecture of the inverted index system of FIG. 1.

FIG. 2 illustrates a high-level hierarchy of system 10. System 10 comprises a record ingest module 205, an index insert module 210, a query interface 215, a query runtime module 220, a statistics manager 225, a map/merge strategy module 230, and an inverted index 235. The inverted index 235 comprises an index dictionary 240, one or more posting list(s) 245, and one or more posting list index(es) 250.

Figure 3:
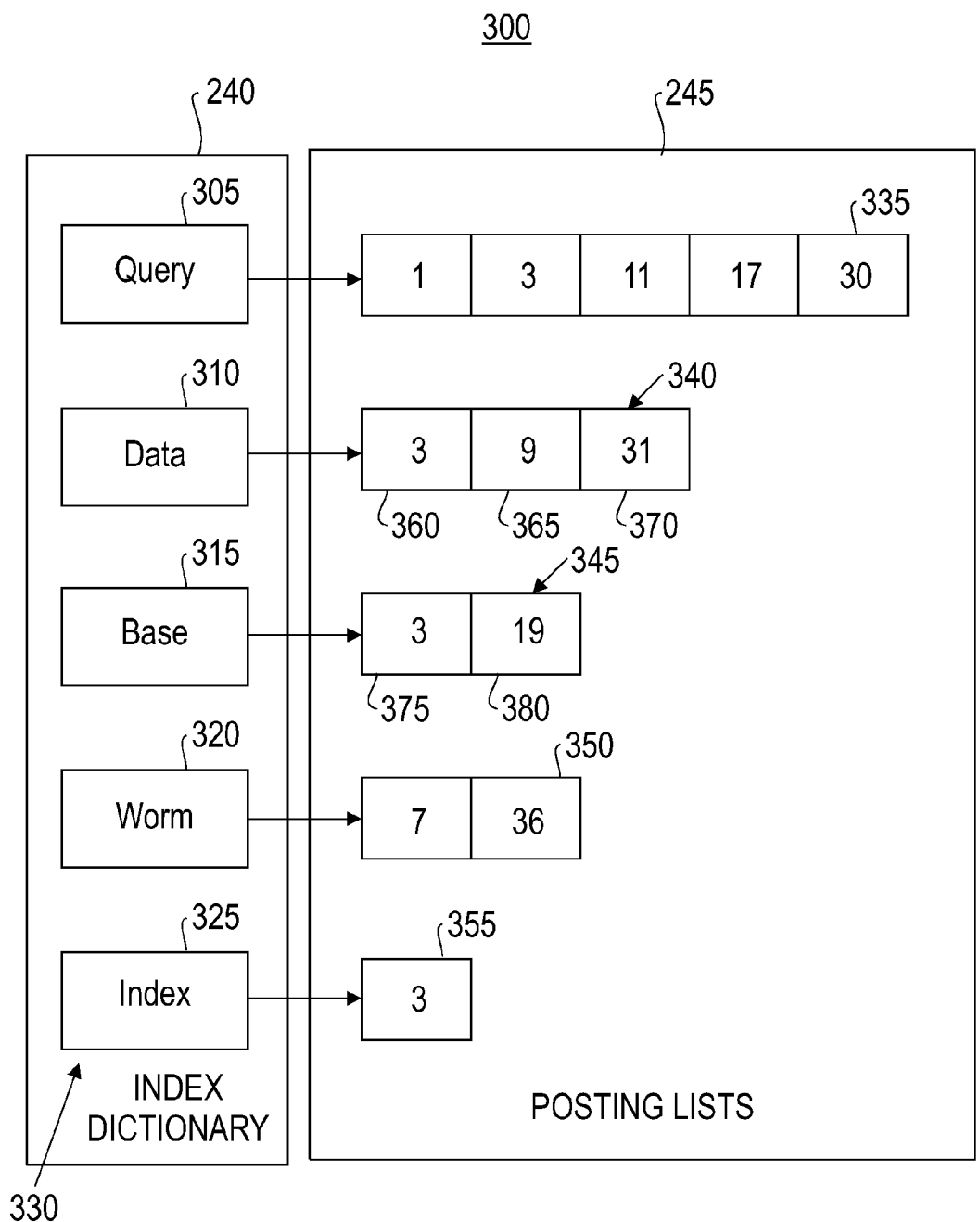
FIG. 3 is a block diagram of an exemplary inverted index generated by conventional indexing systems.

FIG. 3 illustrates an exemplary inverted index 300 (further referenced herein as index 300) generated by a conventional inverted indexing system. In the exemplary index 300, the index dictionary 240 comprises index features such as a term "query" 305, a term "data" 310, a term "base" 315, a term "WORM" 320, and a term "index" 325 (collectively and generally referenced as index feature(s) 330). Each of the index features 330 is associated with a unique one of the posting lists 245. For example, query 305 is associated with a query posting list 335, data 310 is associated with a data posting list 340, base 315 is associated with a base posting list 345, WORM 320 is associated with a WORM posting list 350, and index 325 is associated with an index posting list 355.

Each of the posting lists 245 comprises a list of the record IDs of the records in which the associated feature appears. For example, data posting list 340 comprises ID 3, 360, ID 9, 365, and ID 31, 370. Base posting list 345 comprises ID 3, 375, and ID 19, 380. ID 3, 375, indicates that record 3 contains the associated feature of the index dictionary 240. For example, record 3 contains the terms data 310 and base 315, as indicated by ID 3, 360, and ID 3, 375. Each entry in the posting lists 245 may further contain additional metadata such as feature frequency, feature type, feature position, etc. In one embodiment, each posting list is stored as at least one append-only object (e.g. block, file) in WORM storage.

Figure 4:
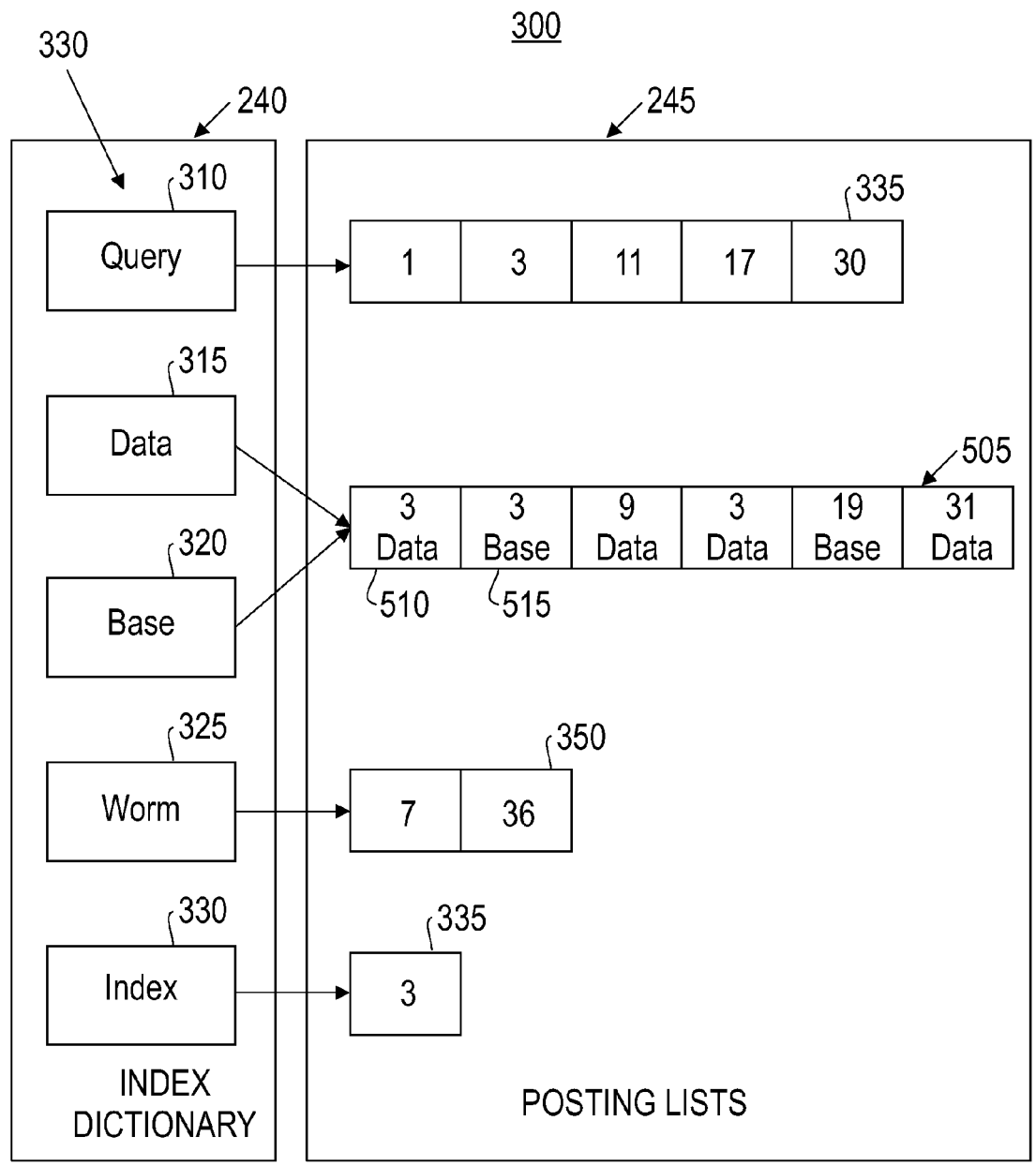
FIG. 4 is a block diagram of an exemplary index comprising posting lists generated by the inverted index system of FIGS. 1 and 2.

System 10 reduces random I/Os by mapping multiple features onto the same posting list. With reference to FIGS. 3 and 4, FIG. 4 illustrates the exemplary index 300 in which system 10 "merges" the data posting list 340 and the base posting list 345 into a merged data/base posting list 505. To remove false positives from the query result, an encoding of the index feature 330 is maintained along with the record ID, in each entry of the merged data/base posting list 505. For example, entry 510 of the merged data/base posting list 505 contains the encoding for the index feature "data" along with record ID 3, indicating the presence of the feature "data" in record 3. Similarly, entry 515 of the merged data/base posting list 505 contains an encoding of the index feature "base" and record 3, indicating the presence of the feature "base" in record 3.

The encoding can be stored in log(q) bits, where q is the number of posting lists 245 that are merged together. In one embodiment, the overhead is further reduced by using an encoding scheme such as, for example, Huffman encoding. This encoding is added to the metadata for each entry in the merged posting lists 245.

Figure 5:
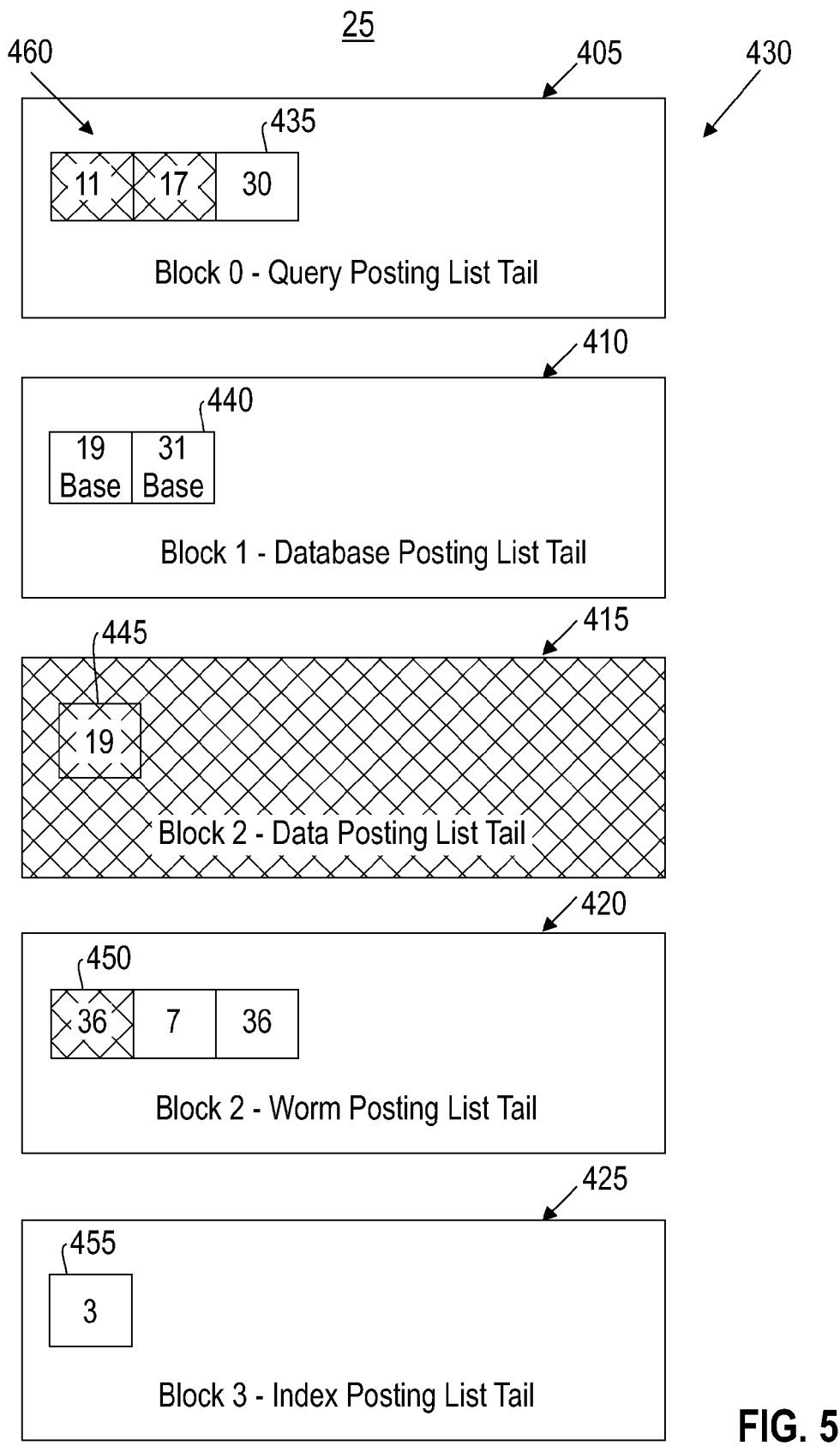
FIG. 5 is a block diagram of an exemplary storage cache comprising the tail blocks of posting lists of the inverted index of FIG. 4.

System 10 maps features onto posting lists 245 such that the number of active posting lists 245 is largely equal to the number of blocks 430 in the storage cache 25. As illustrated in FIG. 5, the storage cache 25 is divided into blocks. Exemplary block sizes include, but are not limited to, 512 B, 4KB, 8KB, 16KB, 32KB, 64KB. The storage cache 25 comprises a block 0, 405, a block 1, 410, a block 2, 420, and a block 3, 425, collectively and generally referenced as blocks 430. Block 0, 405, contains entries of the tail block 435 of the query posting list 335. Block 1, 410, contains entries for the tail block 440 of the merged data and posting lists 505. Block 2, 420, contains entries for the tail block 450 of the WORM posting list 350. Block 3, 425, contains entries for the tail block 455 of the index posting list 355. The tail blocks 435, 440, 450, 455 are collectively and generally referenced as tails 460.

As the blocks 430 are filled and/or evicted from the cache, contents of the evicted blocks are written to the corresponding posting lists 245 on disk. Entries are added to the tails 460 as system 10 processes records in which an associated index feature 330 is identified.

Because the tail blocks are maintained in the storage cache 25, most of the updates to the posting lists 245 hit the storage cache 25. A disk random I/O is incurred only when the contents of the evicted block are written to disk, as compared to requiring a random I/O for each entry written to each of the posting lists 245. Furthermore, by merging posting lists 245 that are smaller than one block into a larger posting list 245, the number of random I/Os is further reduced by decreasing a number of partial blocks written to disk.

System 10 maps features onto posting lists 245 based on frequency of occurrence of the index features 330 in records, queries, or records and queries. In a different embodiment, the index features are mapped onto posting lists randomly. Stated differently, the posting lists are merged randomly.

Queries are answered by scanning the posting lists 245 corresponding to the features in the query. The records in the posting lists 245 are assigned scores based on measures such as, for example, cosine or Okapi BM-25. The scores are used to rank the records.

The total workload cost for answering a set of queries can hence be modeled as follows: Let $q_i$ be the number of queries that contain the $i^{th}$ feature (the query frequency of the $i^{th}$ feature), and let $t_i$ be the number of occurrences of the $i^{th}$ feature or, alternatively, the number of records containing the $i^{th}$ feature (the feature frequency of the $i^{th}$ feature). The total workload cost without any merging is proportional to $$\sum_{1 \le i \le n} t_i * q_i \quad (1)$$

To minimize index update time, system 10 merges the posting lists 245 into M lists, where M is the number of blocks 430 available in the storage cache 25. Merging the posting lists 245 into M lists, $A_1, \ldots A_M$, yields a workload cost proportional to $$Q = \sum_{1 \le i \le M} \left( \left( \sum_{k \in A_i} t_k \right) \left( \sum_{k \in A_i} q_k \right) \right) \quad (2)$$

In general, a small fraction of the index features 330 account for most of the workload cost. Consequently, system 10 merges posting lists 245 for index features 330 that are infrequently queried or infrequently used, while not merging posting lists 245 for index features 330 that are frequently queried or frequently used. In one embodiment, the statistics manager 225 and the map/merge strategy module 230 are provided with estimates of the feature frequency $t_i$ and the query frequency $q_i$.

In one embodiment, system 10 learns the frequencies online as records are processed, and adapts the mapping/merging strategy accordingly. In one embodiment, system 10 divides time into epochs and maintains a separate index for the records inserted in each epoch. The choice of posting lists 245 to merge in any particular epoch can be determined by the statistics collected during the previous epoch. Queries are answered by scanning the index 235 of all epochs. By keeping the epoch interval large enough, system 10 can keep the number of separate versions of index 235 manageable. Furthermore, query interfaces typically support query conditions on record creation time (e.g., to retrieve only records created in 2004). For such queries, system 10 only needs to consider any index 235 associated with an epoch that overlaps with the time interval specified in the query. The exact time range restrictions can be checked in a filtering phase after the feature search.

In a different embodiment, system 10 merges the terms randomly. When the $q_i$ and $t_i$ follow the Zipfian distribution, very few terms have high $t_i$ or $q_i$. As long as the posting lists of the popular terms do not get merged with each other, merging does not slow down query response significantly. If the number of posting lists is substantially larger than the number of popular terms (as with the larger cache sizes), these unlucky merges are unlikely to occur.

Figure 8:
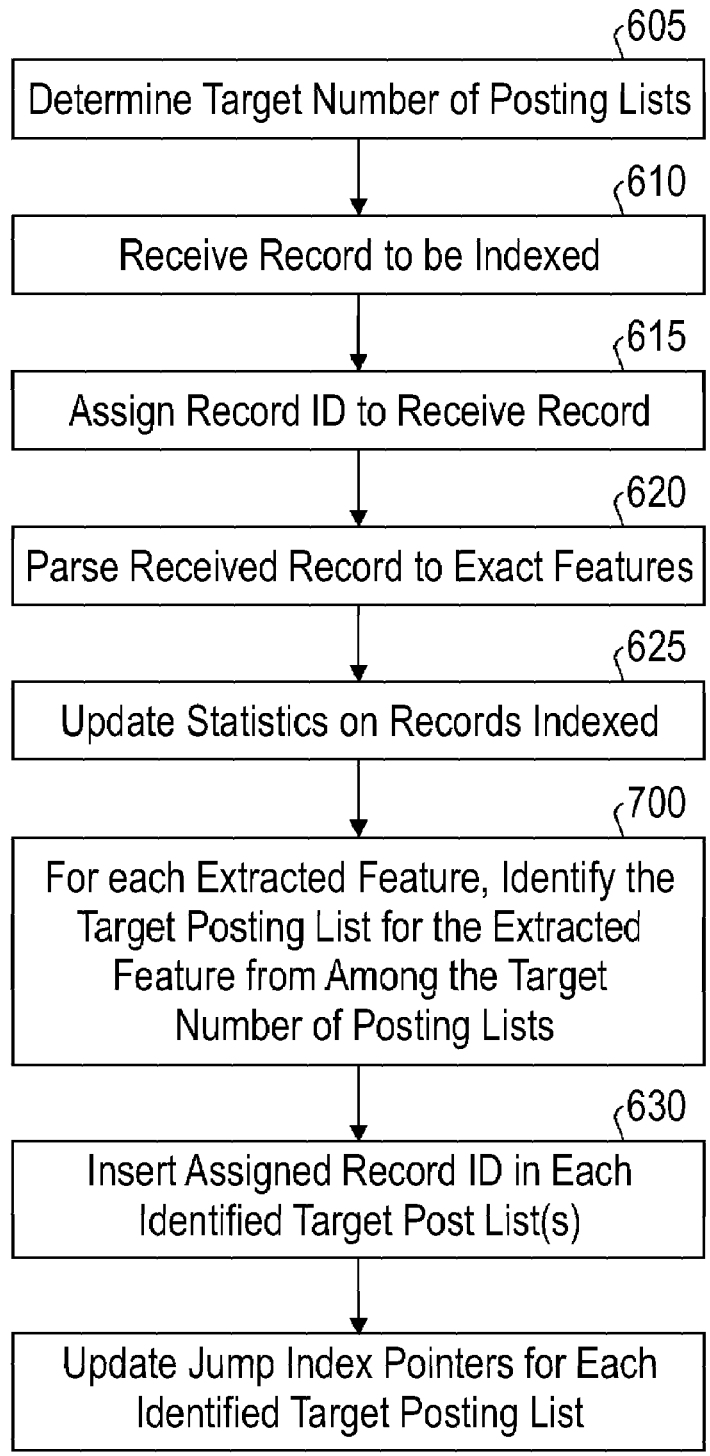
FIG. 8 is a process flow chart illustrating a method of operation of the inverted index system of FIGS. 1 and 2 for inserting new records into the inverted index.

FIG. 8 illustrates a method 600 of system 10 in generating an inverted index 235. The map/merge strategy module 230 determines the target number of posting lists to be maintained (step 605). In one embodiment, the determination is based on the size of the storage cache 25 available for system 10. The record ingest module 205 receives a record to be indexed (step 610). The record ingest module 205 assigns a record ID to the received record (step 615). The index insert module 210 parses the received record to extract features such as, for example, keywords, terms, tones, colors, shapes (step 620). The statistics manager 225 updates statistics related to the records indexed by system 10 such as, for example, frequency of occurrence of the extracted features (step 625). For each extracted feature, the map/merge strategy module 230 identifies a target posting list 245 for the extracted feature from among the target number of posting lists 245 (step 700). The index insert module 210 inserts the assigned record ID into each identified target posting list(s) 245 (step 630). In one embodiment, the assigned record ID is appended to each of the identified posting list(s) 245. The jump index structure of the posting lists is updated by setting up pointers to the newly inserted entries (step 640), as given in FIG. 9 (explained later).

In one embodiment, the target posting list is determined based on the value of a hash function applied to the extracted feature. An example hash function is to sum all the characters in a term modulo the target number of posting lists.

In one embodiment, the target posting list 245 for the extracted feature is determined based on the feature frequency $t_i$ and the corresponding query frequency $q_i$. In one embodiment, a feature with feature frequency $t_i$ and/or query frequency $q_i$ above a predetermined threshold is mapped to its own unique posting list, i.e. it is not merged. In one embodiment, a feature with feature frequency $t_i$ and/or query frequency $q_i$ ranked above some percentage of the corresponding population frequencies is mapped to its own unique posting list. In one embodiment, a remaining feature is mapped to a posting list determined based on the value of a hash function applied to the feature.

In one embodiment, the frequencies are learned online as records are processed. In one embodiment, the method divides time into epochs and maintains a separate index for the records inserted in each epoch. In any particular epoch, the target posting list is determined based on the statistics collected during the previous epoch.

Figure 10:
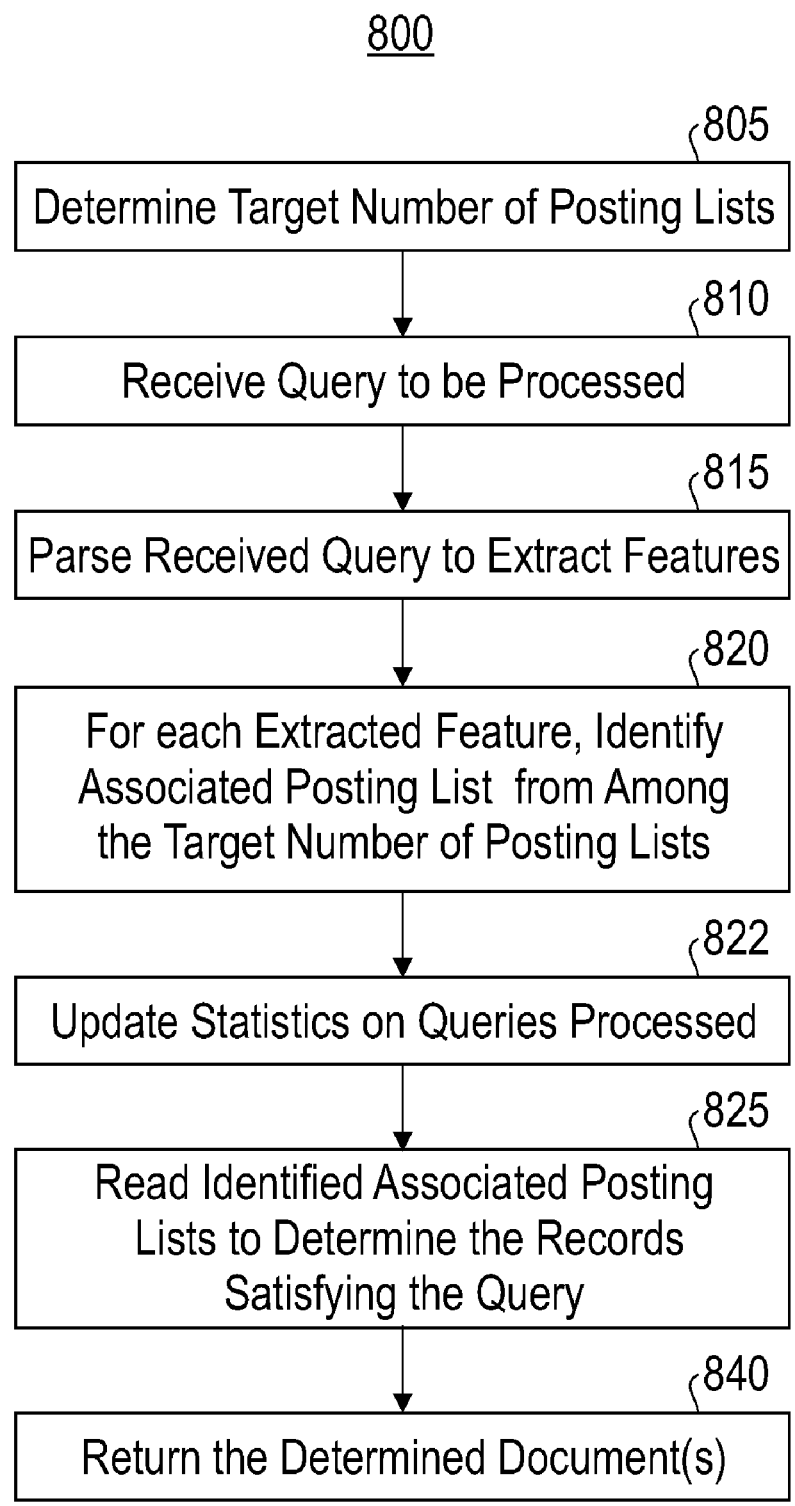
FIG. 10 is a process flow chart illustrating a method of operation of the inverted index system of FIGS. 1 and 2 for querying the inverted index.

FIG. 10 illustrates a method of system 10 in querying an inverted index 235. The map/merge strategy module 230 determines the target number of posting lists (step 805). The query interface 215 receives a query to be processed (step 810). The query runtime module 220 parses the received query to extract features (step 815). The statistics manager 225 updates statistics related to the queries that have been processed by system 10 (step 822). For each extracted feature, the map/merge strategy module 230 identifies an associated posting list 245 from among the target number of posting lists 245 (step 820). The query runtime module 220 reads the identified associated posting lists 245 to determine the record (s) satisfying the query (step 825). The query interface 215 returns the determined record(s) (step 840).

In one embodiment, step 825 includes performing a ZIG-ZAG join over more than one of the identified associated posting lists to answer conjunctive queries, which are queries in which more than one of the search features are required to be present in a record for the record to be returned in response to the query). The ZIG-ZAG algorithm skips over portions of the posting list which cannot appear in the join result, by calling the FindGeq( ) operation. The pseudo-code for ZIG-ZAG join is given below:

| ZIG-ZAG(list1, list2) |
|---|
| 1: top1 = list1.Start( ); |
| 2: top2 = list2.Start( ); |
| 3: loop |
| 4:   if ((top1==list1.End( )) \|\| (top2==list2.End( ))) |
| 5:      return; |
| 6:   endif |
| 7:   If (*top1 < *top2) |
| 8:      top1 = list1.FindGeq (*top2); |
| 9:      continue; |
| 10:  endif |
| 11:  If (*top2 < *top1) |
| 12:     top2 = list2.FindGeq (*top1); |
| 13:     continue; |
| 14:  endif |
| 15:  If (*top1 == *top2) |
| 16:     OUTPUT (*top1); |
| 17:     top1 = list1.FindGeq(*top1+1); |
| 18:     top2 = list2.FindGeq(*top2+1); |
| 19:  endif |
| 20: endloop |

The query runtime module 220 first sets the posting list iterators to start of the two posting lists (steps 1, 2). The query runtime module 220 checks if either of the iterators have reached the end of the posting lists (step 4). If this is the case, there are no further query results. If this is not the case, the query runtime module 220 compares the two posting list entries pointed to by the iterators—If they are equal (step 15), the module outputs the matching entries as the next joined result (step 16). If they are not equal, the module advances the iterator pointing to the smaller entry to an entry greater than or equal to the larger entry (using the FindGeq( ) call) (steps 8, 12).

System 10 supports FindGeq( ) in a maximum number of O(log(N)) operations using a jump index, where N is the largest number in the sequence. This bound is generally weaker than the O(log(n)) bound for B+ tree lookups, where n is the number of entries in the tree. However, in system 10, N is equal to the number of stored records, because record IDs are assigned through an increasing counter. Hence, the bound for the jump index in system 10 is logarithmic in the number of records.

The jump index structure exploits the fact that the record IDs in a posting list form an increasing sequence. The jump index provides a trustworthy lookup mechanism because IDs inserted into the index structure are not relocated and the path through the index structure to the Id is immutable.

The intuition behind jump pointers in system 10 is that one can get to any number $k \leq N$ in $O(\log_2(N))$ steps by taking jumps in powers of 2. Consider a sequence of numbers $0, \ldots, N-1$, where $N=2^p$. Let $b_1 \ldots b_p$ be the binary representation of an integer $0 \leq k < N$. One can reach k in p steps by starting at the beginning of the sequence then successively jumping $b_1 * 2^{p-1}$ places, then $b_2 * 2^{p-2}$ places, and so on until $b_p * 2^0$ jump forward arrives at k.

System 10 applies this approach to posting lists 245. The posting list 245 does not contain every record ID, so system 10 stores explicit jump pointers that indicate how far ahead to jump. The $i^{th}$ jump pointer stored with a list entry points to the smallest list entry I' such that $$I+2^i \leq I' < I+2^{i+1}. \qquad (3)$$

Figure 6:
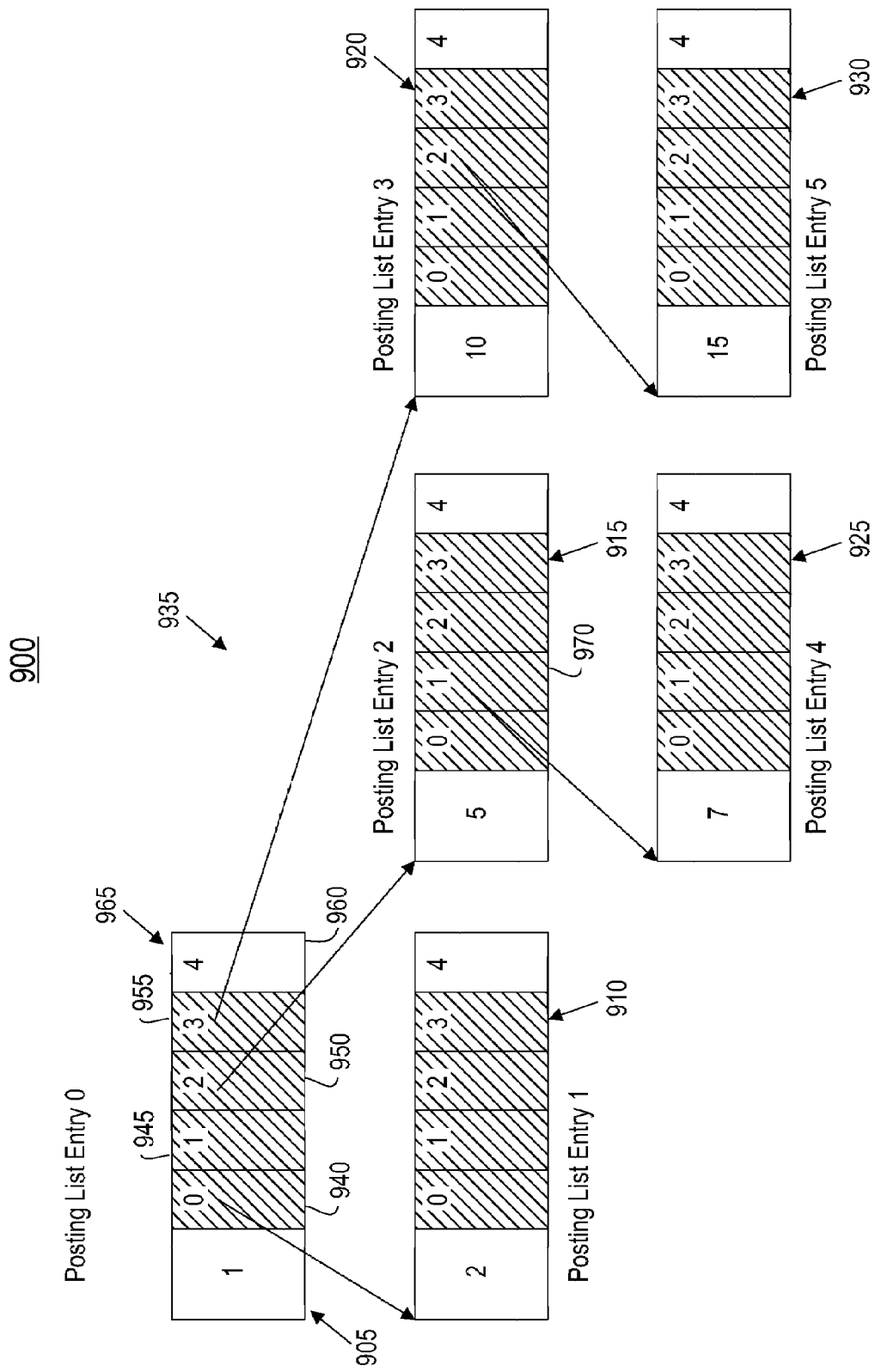
FIG. 6 is a block diagram illustrating an exemplary inverted index system of FIGS. 1 and 2 using jump pointers pointing to entries in a posting list of the inverted index.

FIG. 6 illustrates index 900 comprising a posting list entry 0, 905, a posting list entry 1, 910, a posting list entry 2, 915, a posting list entry 3, 920, a posting list entry 4, 925, a posting list entry 5, 930, collectively referenced as posting list entries 935. Posting list entries 935 are entries in one of the posting lists 245. Each of the posting list entries 935 comprises a set of jump pointers. For example, posting list entry 0, 905 comprises a jump pointer 0, 940, a jump pointer 1, 945, a jump pointer 2, 950, a jump pointer 3, 955, and a jump pointer 4, 960 (collectively referenced as jump pointers 0, 965, indicating that this is a set of pointers for posting list entry 0, 905).

Shaded jump pointers that point to valid entries are shown with the origination of an arrow, e.g., the jump pointer 0, 940. Shaded pointers that are not shown with the origination of an arrow (e.g., the jump pointer 1, 945) are set to null. Unshaded pointers such as the jump pointer 4, 60, have never been written.

The jump pointer 0, 940, points to the posting list entry 1, 910, because the record ID entry for the posting list entry 0, 905, is 1 and the record ID for the posting list entry 1, 910, is 2 (using equation 3):

$$1+2^0 \leq 2 < 1+2^1$$

The jump pointer 2, 950, points to posting list entry 2, 915, because the record ID for the posting list entry 0, 905, is 1 and the record ID entry for the posting list entry 2, 950, is 5 (using equation 3):

$$1+2^2 \leq 5 < 1+2^3$$

Additional jump pointers are determined similarly.

More generally, let the entries of the posting lists 245 be $n_1, \ldots, n_N$. System 10 can look up an entry by following jump pointers from the smallest number in the sequence. To look up an entry, e.g. n, system 10 finds $l_1$ such that $n_1+2^{i_1} \leq n < n_1+2^{i_1+1}$ and follows jump pointer associated with $i_1$ from $n_1$ to a number, e.g., $n_{i_1}$. From $n_{i_2}$, system 10 finds $i_2$ such that $n_{i_1}+2^{i_1} \leq n < n_{i_1}+2^{i_1+1}$, and follow the jump pointer associated with $i_2$ to $n_{i_2}$, and so on until system 10 reaches n. To look up 7 in posting list entry 4, 925, in FIG. 6, system 10 follows the jump pointer 2, 950, ($i_1=2$) from 1 in posting list entry 0, 905, to 5 in the posting list entry 2, 915, and a jump pointer 1, 970, ($i_2=1$) from 5 (in the posting list entry 2, 915) to 7 (in the posting list entry 4, 925).

In one embodiment, system 10 reduces the overhead of storing the jump pointers and the depth of the index, which impacts performance, by storing posting entries together in block of size L and associating pointers with blocks, rather than with every entry.

Figure 9:
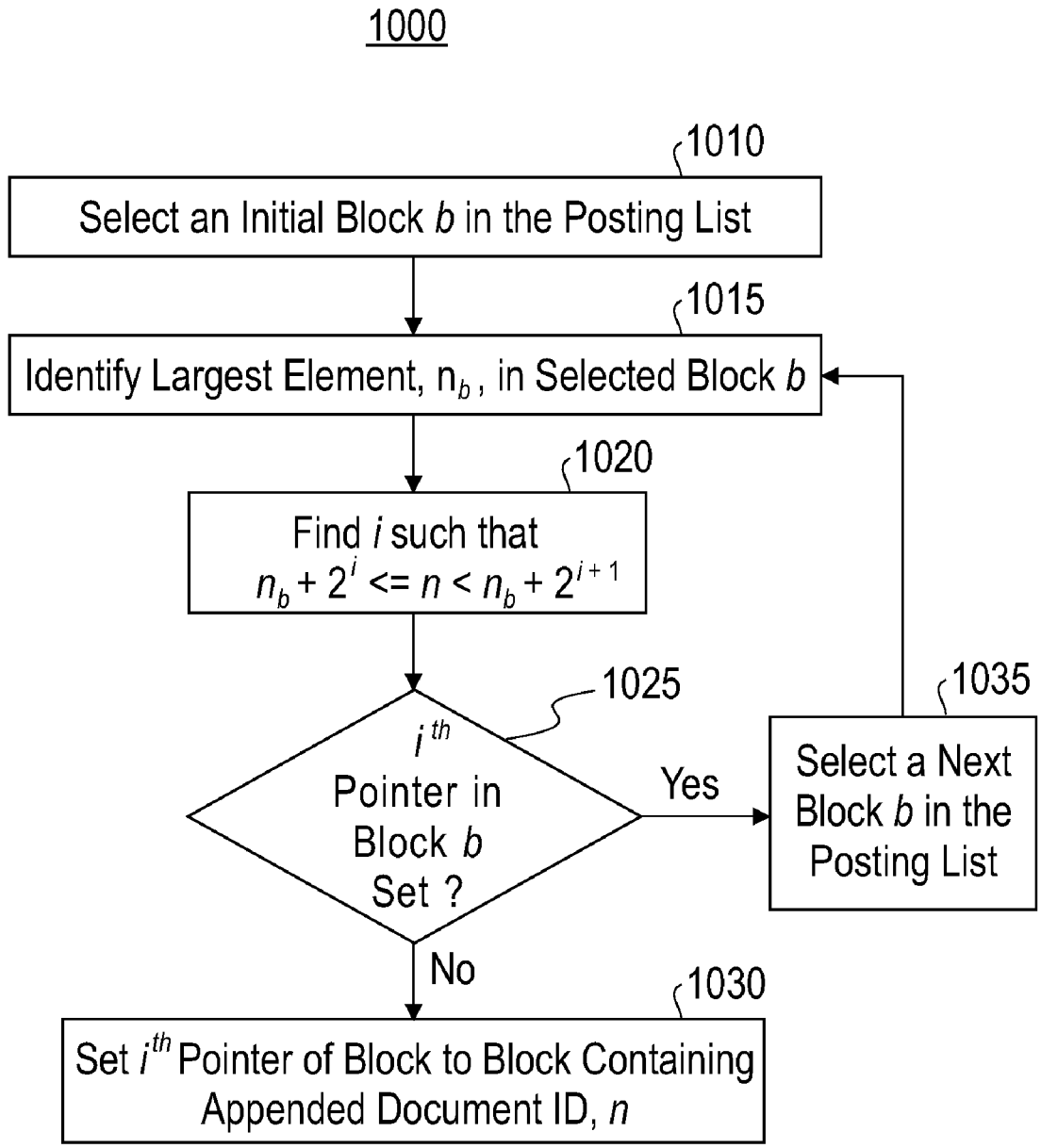
FIG. 9 is a process flow chart illustrating a method of the index system of FIGS. 1 and 2 for setting jump pointers to the block in which a record ID is inserted.

FIG. 9 illustrates a method 1000 of setting pointers to a jump index node in which the record ID, n, (step 640 of FIG. 8) is inserted. In an embodiment, each node of the jump index corresponds to a block of the associated posting list. The index insert module 210 selects an initial block b in the posting list 245 (step 1010). The index insert module 210 selects a reference entry in the selected block b (step 1015). In one embodiment, the selected reference entry is the largest entry, $n_b$, in the selected block b. The index insert module 210 determines i (step 1020) such that $$n_b + 2^i \leq n < n_b + 2^{i+1} \qquad (4)$$

The index insert module 210 determines whether the $i^{th}$ pointer of block b has been set (decision step 1025). If no, the index insert module 210 sets the $i^{th}$ pointer of block b to the block containing the appended record ID, n (step 1030). If the $i^{th}$ pointer of block b has been set (decision step 1025), the index insert module 210 selects a next block b (step 1035) and returns to step 1015. The index insert module 210 repeats steps 1015 through 1035 until the pointer is set.

Pseudocode for FindGeqRec(k, s) (interchangeably referenced herein as FindGeqRec( )), a function implementing FindGeq(k) is as follows:

```
21: IF (s ≥ k) THEN
22:    RETURN s
23: END IF
24: Find i ≥ 0 such that s + 2^i 2 k 2 s + 2^i + 1
25: IF (ptr[i] ≠ NULL) THEN
26:    t ← record ID at ptr_s[i]
27:    ASSERT s + 2^i 2 t 2 s + 2^i + 1
28:    res ← FindGeqRec(k,t)
       COMMENT Recursively call FindGeqRec( ) by following the ptr
29:    IF (res ≠ NOT_FOUND) THEN
30:       ASSERT s + 2^i 2 res 2 s + 2^i + 1
31:       RETURN res
32:    END IF
33: END IF
    COMMENT: No number ≥ k is found by following ith ptr. RETURN
    the first non-null ptr.
34: i ← i + 1
35: WHILE (i < log_2(N)) DO
36:    IF (ptr_z[i] ≠ NULL) THEN
37:       t ← record ID at ptr_s[i]
38:       ASSERT s + 2^i 2 t 2 s + 2^i +
39:       RETURN t
40:    END IF
41:    i ← i + 1
42: END WHILE
43: RETURN NOT_FOUND
```

Pseudocode for FindGeq(k) (interchangeably referenced herein as FindGeq( )), to find number≥k is as follows:

1: RETURN FindGeqRec (k, the smallest number in the sequence)

The jump index also supports an insert operation Insert(k) (interchangeably referenced herein as Insert( )), for inserting ID k into the index 900 (FIG. 6) and a lookup operation for finding an entry k from the index 900. The pseudo-code of the two operations have been given below. The notation $ptr_s[i]$ refers to the $i^{th}$ jump pointer for index entry s. The pseudo-codes include assert checks, violations of which may trigger a report of attempted malicious activity.

```
Insert(k)
 1: IF index is empty THEN
 2:    Create a new index with a node containing k
 3:    RETURN
 4: END IF
 5: s ← the smallest record ID in the index
 6: ASSERT s < k
    COMMENT: The index entries are required to be monotonically
    increasing
 7: LOOP
 8:    Find 1 ≥ 0, such that s + 2^i 2 k < s + 2^i +1
 9:    IF (ptr_s[i]==NULL) THEN
10:       Create a new index node containing k
11:       ptr [i] ← ks location // Set the ith pointer of s
12:       RETURN DONE
13:    ELSE
14:       s← the record ID at ptr_s[i]
          COMMENT: Follow the pointer to a new s
15:       ASSERT s< k
16:       s ← s
17:       CONTINUE
18:    END IF
19: END LOOP
Lookup(k)
 1: s ← the smallest record ID in the index
 2: LOOP
 3:    IF s > k
 4:       RETURN NOT_FOUND
 5:    END IF
 6:    IF s==k THEN
 7:       RETURN FOUND
 8:    END IF
 9:    Find i ≥ 0 such that s + 2^i 2 k 2 s + 2^i +1
10:    IF ptr_s[i]==NULL THEN
11:       RETURN NOT_FOUND
12:    ELSE
13:       s← the record ID at ptr_s[i]
          COMMENT: Follow the pointer to a new s
14:       ASSERT s + 2^i 2 k 2 s + 2^i +1
15:       s ← s^1
16:       CONTINUE
17:    END IF
18: END LOOP
 2:
```

Proposition 1: Let $i_1, \ldots, i_j$ be the values of i selected in step 9 in successive iterations of the loop in Lookup(k), previously discussed. Then $i_1 > L > i_j$.

Proof: Let the record IDs whose jump nodes are visited by Lookup(k) be $s_1, \ldots, s_j$, where $s_1$ is the smallest number in the posting list. From step 9 Lookup(k), $s_1 + 2^{i_1} \leq k < s_1 + 2^{i_1+1}$ (a). Also, since the pointer associated with $i_1$ points to $s_2$, and $s_2$ has been inserted previously, then $s_1 + 2^{i_1} \leq s_2 < s_1 + 2^{i_1+1}$, i.e., $s_2 \geq s_1 + 2^{i_1}$ (b). Further, $s_2 + 2^{i_2} \leq k < s_2 + 2^{i_2+1}$ (c). From (a) and (c), $s_2 + 2^{i_2} < s_1 + 2^{i_1+1}$ (d). From (b) and (d), $s_1 + 2^{i_1} + 2^{i_2} s_1 + 2^{i_1+1}$. Hence, $i_1 > i_2$. By repeating the same argument, $i_1 > \ldots > i_k$. QED From step 9 of Lookup(k), $i_1 \leq \lfloor \log_2(k) \rfloor + 1$. Thus it takes at most $\lfloor \log_2(k) \rfloor + 1$ jumps to find k. It can similarly be argued that Insert ( ) and FindGeq( ) also require $O(\log_2(k))$ pointer follows. If there are N records in the index 235, the complexity of the operation is, therefore $O(\log_2(N))$.

A straightforward approach to storing jump pointers in a WORM device is to maintain each node of the index in a separate disk block. Because of the monotonicity property of record IDs, the pointers are also set in increasing order; i.e., $ptr_s[i]$ is always set after $ptr_s[i']$ if $i' < i$. Hence the pointer assignment operation can also be implemented as an append operation. Under this approach, indexes and their associated posting lists have the following properties.

Proposition 2: Once and ID has been inserted into an index and the associated posting list, it can always be looked up successfully.

Proof Outline: The pointers set up during Insert ( ) (step 11 in pseudocode for Insert ( ), previously discussed) are written to WORM, so the pointers and the entries cannot be altered afterwards. The values of $i(i_1, \ldots, i_j)$ selected by Insert ( ) are the same as those selected by Lookup( ). Hence an entry that has been inserted is always visible to Lookup( ). QED Proposition 3: Let v be an ID in the posting list 245. If $k \leq v$, then FindGeq(k) does not return a value greater than v.

Proof Outline: Suppose the path to v in the index is through jump pointers $j_1, K, j_{o_j}$ (i.e., Lookup(v) selects $j_1, K, j_{o_j}$ in successive iterations of the loop of step 9 in Lookup( )). Also suppose FindGeq(k) returns l and $i_1, K, i_{o_j}$ is the path to l in the index, that is $i_1, K, i_{o_j}$ are selected in step 4 of Lookup ( ) (or step 15 of Lookup( ) if the checks in line 5 or line 9 of Lookup ( ) fail) of successive calls to FindGeq(k).

To show that $i_1 \leq j_1$, consider the initial call to FindGeqRec( ). In line 4 of FindGeqRec( ), $i \leq j_1$ is chosen, as $k \leq v$. If the checks in line 5 and line 9 of FindGeqRec( ) succeed for that i, $i_1 = i$ and hence $i_1 \leq j_1$. If either of the checks in line 5 or line 9 of FindGeqRec( ) fails, FindGeqRec( ) selects an i on line 15. However, since v is in the index, $prt_0[j_1]$ is not NULL. Therefore, system 10 does not go beyond $j_1$, hence $i_1 \leq j_1$. Now the following cases arise: (i) $i_1 < j_1$ and (ii) $i_1 = j_1$. In the case of $i_1 < j_1$, $l < v$ ($l < s_0 + 2^{i_1+1} \leq s_0 + 2_1^j \leq v$). In the case of $i_1 = j_1$, the argument can be inductively applied to the next call to FindGeqRec( ). QED Proposition 3 ensures that no record ID can be hidden when joining two posting lists 245. Consider a record ID d present in both posting lists being joined. The join starts from the smallest numbers in the lists and makes successive calls to FindGeq( ). Proposition 3 ensures that no number greater than d can be returned in a FindGeq( ) call, before d is returned. In other words, d is eventually returned in a FindGeq( ) call on both the lists and hence appears in the result.

In one embodiment, system 10 defines jump pointers using powers of B rather than powers of two, where $p \geq B$. System 10 maintains $(B-1) \log_B(N)$ pointers with every block, with each pointer uniquely identified by a pair (i,j), where $0 \leq i < \log_B(N)$ and $1 \leq j < B$. The pointers are set up as follows: Let $I_1$ be the largest record ID stored in block b. The (i,j) pointer in b points to the block containing the smallest record ID s such that $$I_1 + jB^i \leq s < I_1 + (j+1)B^i. \qquad (5)$$

Figure 7:
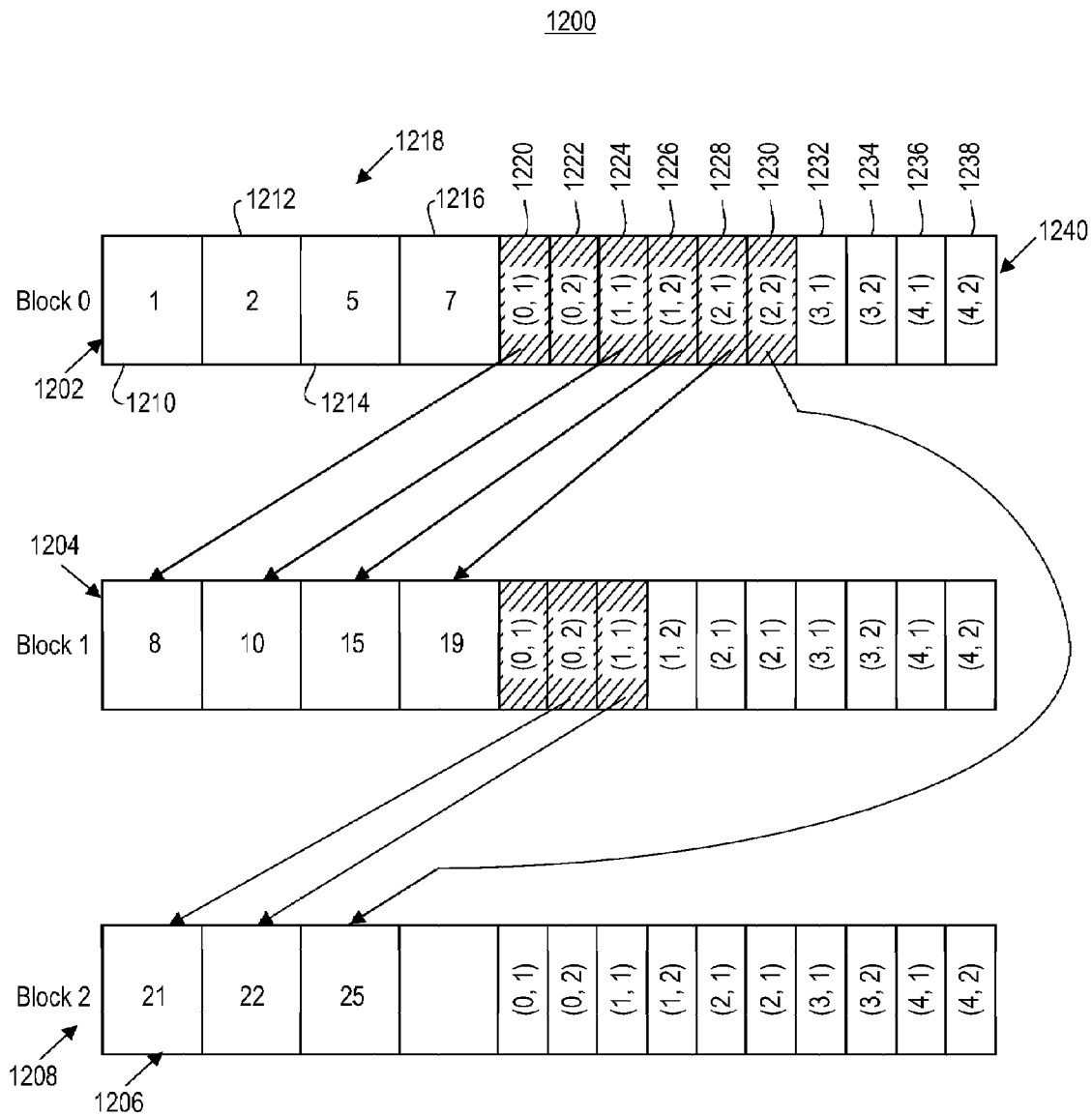
FIG. 7 is a block diagram illustrating an exemplary inverted index system of FIGS. 1 and 2 using jump pointers pointing to blocks in a posting list of the inverted index.

FIG. 7 illustrates and exemplary index 1200 for the case p=4 and B=3, illustrating pointers for $0 \leq i \leq 4$. The exemplary index 1200 comprises a posting list block 0, 1202, a posting list block 1, 1204, and a posting list block 2, 1206, collectively referenced as posting list blocks 1208. Each of the posting list blocks 1208 comprise posting list entries and jump pointers. For example, posting list block 0, 1202, comprises a posting list entry 0, 1210, a posting list entry 1, 1212, a posting list entry 2, 1214, and a posting list entry 3, 1216, collectively referenced as posting list entries 1218. The posting list block 0, 1202, further comprises jump pointers such as a jump pointer (0,1) 1220, a jump pointer (0,2) 1222, a jump pointer (1,1) 1224, a jump pointer (1,2) 1226, a jump pointer (2,1) 1228, a jump pointer (2,2) 1230, a jump pointer (3,1) 1232, a jump pointer (3,2) 1234, a jump pointer (4,1) 1236, and a jump pointer (4,2) 1238, collectively referenced as jump pointers 0, 1240.

The largest number in block 0 1205 is 7, in posting list entry 1216. The jump pointer (0,1) 1220 points to the posting list block 1, 1204, because the posting list block 1, 1204, contains 8 (using equation 5):

$$7+1*3^0 \leq 8 < 7+2*3^1.$$

The number 8 in the posting list block 1, 1204, is the smallest number satisfying that constraint. Similarly, the jump pointer (2,2) 1230 of the posting list block 0, 1202, points to the posting list block 2, 1206, because the posting list block 2, 1206, contains 25 (using equation 5):

$$7+2*3^2 \leq 25 < 7+3*3^2$$

In this embodiment, the index insert module 210 comprises pseudocode Insert_block(i) (interchangeably referenced herein as Insert_block( )) for inserting record id k in index 235. The query runtime module 220 comprises pseudocode Lookup_block( ) for locating record ID k in a block in posting lists 245.

Pseudocode Insert_block(k) for inserting record id k in the index 235 is as follows:

```
1: last_block ← last block in the index
2: If last block is full (has p entries), allocate a new block and set
       last_block to new block.
3: Append (k) to the last_block.
4: b ← initial_block
5: LOOP
6:    IF (b==last_block) THEN
7:       RETURN DONE
8:    END IF
9:    n ← the largest ID in block b
10:   ASSERT n_b < k
11:   Find (i,j) such that 0²i < log_R(N),1 ≤ j < B, and
          n_b + j * B^i ²k < n_b + (j + 1) * B^i
12:   IF ptr_b[i,j] ≠ NULL THEN
13:      b ← ptr_b [i,j]
          COMMENT: ptr_b[i,j] is the (i,j)th pointer in block b
14:      CONTINUE
15:   ELSE
16:      ptr_b [i,j] ← last_block
17:      RETURN
18:   END IF
19: END LOOP
```

Pseudocode for Lookup_block(k) (interchangeably referenced herein as Lookup_block( )) for inserting record id k in index 235 is as follows:

```
1: ← The number being searched for.
2: b ← the initial block of the index
3: LOOP
4:    n_b ← the largest ID in block b
5:    IF (k ≤ n_b) THEN
6:       Search for k in b, and RETURN FOUND or NOT_FOUND
7:    END IF
8:    Find (i,j) such that 0² i < log_B(N),1 ≤ j < B, and
          n_b + j * B^i ²k < n_b + (j + 1) * B^i
9:    IF ptr_b[i,j] ≠ NULL THEN
10:      b ← ptr_b [i,j]
          COMMENT: ptr_b[i,j] is the (i,j)th pointer in block b
11:      CONTINUE
12:   ELSE
13:      RETURN NOT_FOUND
14:   END IF
15: END LOOP
```

As when B=2, the pointer set operation in step 15 of Insert-block( ) can be implemented by an append operation. As with B=2, one can show that if the lookup proceeds by following pointers $i_1, \ldots, i_k$, then $i_1 < \ldots < i_k$. This gives a bound of $\log_B(N)$ jumps for Lookup( ).

In one application of system 10, system 10 is used to index time sequences. System 10 may be used to index and application in which the entries are always increasing.

It is to be understood that the specific embodiments of the invention that have been described are merely illustrative of certain applications of the principle of the present invention. Numerous modifications may be made to the system and method for providing a trustworthy inverted index to enable searching of records described herein without departing from the spirit and scope of the present invention. Moreover, while the present invention is described fir illustration purpose only in relation to records and WORM storage, it should be clear that the invention is applicable as well to, for example, any type of record stored in any type of storage medium.

What is claimed is:

1. A processor-implemented method of providing an inverted index to enable searching of records, the method comprising:
   processing the records to identify features for indexing in the inverted index;
   generating a plurality of posting lists from the records, wherein each of the plurality of posting lists corresponds to at least one of the identified features;
   maintaining, in a storage cache, a tail block of at least one of the plurality of posting lists to minimize random Input/Output to the inverted index;
   creating a merged posting list by moving posting lists smaller than one cache block into a combined posting list for reducing the size of the inverted index with a reduction in the plurality of posting lists;
   storing the plurality of posting lists in a write-once-read-many (WORM) storage;
   storing tail blocks removed from the storage cache into one of the plurality of posting lists in the WORM storage;
   maintaining an encoding of the identified features for the inverted index and a record identifier in each entry of the merged posting list;
   determining a desired number of the plurality of posting lists based on a desired level of any of an insertion performance, a query performance, and a size of the storage cache;
   receiving a query that includes a search feature;
   ranking records in the plurality of posting lists for answering the query to the plurality of posting lists;
   reading a posting list corresponding to the search feature in the query, in order to identify records that include the search feature; and
   displaying the plurality of posting lists on a display device.

2. The method of claim 1, wherein determining the desired number of plurality of posting lists based on the size of the storage cache comprises dividing an available size of the storage cache by an allowed size for each one of the posting lists.

3. The method of claim 2, wherein the allowed size of each of the plurality of posting lists ranges between approximately 512 B and 64 KB.

4. The method of claim 1, wherein generating the plurality of posting lists comprises mapping multiple features randomly to the merged posting list.

5. The method of claim 4, wherein the multiple features mapped to the merged posting list comprise the features that occur infrequently in the processed records.

6. The method of claim 4, wherein the multiple features mapped to the merged posting list comprise the features that occur infrequently in queries.

7. The method of claim 4, wherein the multiple features mapped to the merged posting list are determined based on a hash of the multiple features.

8. The method of claim 1, wherein the plurality of posting lists are stored in WORM storage.

9. The method of claim 1, wherein processing the records includes updating statistics associated with the records processed.

10. The method of claim 1, wherein receiving a query includes parsing the query to extract a feature, and updating statistics associated with the received queries.

11. The method of claim 1, wherein generating the plurality of posting lists includes generating an index structure including the entries in the posting lists; and
   wherein reading the posting list includes looking up the index structure.

12. A computer-implemented method of providing an index to enable searching of records, the method comprising:
   generating an index structure for an increasing sequence of record identifiers and index features;
   generating posting lists with the record identifiers and frequency of the index features;
   creating a merged posting list by moving posting lists smaller than one block into combined posting lists for reducing the size of the index with a reduction in the number of the posting lists;
   searching the combined posting lists in response to a query searching the records;
   inserting an identifier for a new record into the index structure beginning at a root node of the index structure;
   wherein inserting the identifier of the new record comprises comparing the identifier of the new record and a reference identifier at the root node of the index structure; and
   upon a determination that inserting the identifier of the new record is unsuccessful, identifying a target node in the index structure based on a jump pointer that points to the target node, and recursively repeating the step of inserting the identifier of the new record starting at the target node, until the identifier of the new record is successfully inserted into the index structure; and
   displaying the combined posting lists on a display device.

13. The method of claim 12, wherein the inserted identifier is not relocated and the path through the index structure to the identifier is immutable.

14. The method of claim 12, further comprising generating a new node if the target node does not exist and updating a jump pointer to point to the new node.

15. The method of claim 12, wherein the jump pointer is identified using a mathematical difference between the identifier and the reference identifier of a current node.

16. The method of claim 12, wherein the jump pointer is identified using a logarithm of a mathematical difference between the identifier and the reference identifier of a current node.

17. The method of claim 12, wherein the reference identifier is a largest identifier stored in the node.

18. The method of claim 12, wherein the index structure is tree-like.

19. A processor-implemented system for providing an inverted index to enable searching of records, the system comprising:
   a record ingest module for processing the records to identify features for indexing in the inverted index;

an index insert module for generating a plurality of posting lists from the records, wherein each of the plurality of posting lists corresponds to at least one of the identified features;

a storage cache for maintaining a tail block of at least one of the plurality of posting lists to minimize random Input/Output to the inverted index;

a merge module for creating a merged posting list by moving posting lists smaller than one cache block into a combined posting list for reducing the size of the inverted index with a reduction in the plurality of posting lists, and for maintaining an encoding of the identified features for the inverted index and a record identifier in each entry of the merged posting list;

a write-once-read-many (WORM) storage for storing the plurality of posting lists, and storing tail blocks removed from the storage cache into one of the plurality of posting lists;

a strategy module for determining a desired number of the plurality of posting lists based on a desired level of any of an insertion performance, a query performance, and a size of the storage cache;

a query interface for receiving a query that includes a search feature;

a ranking module for ranking records in the plurality of posting lists for answering the query to the plurality of posting lists;

a query runtime module for reading a posting list corresponding to the search feature in the query, in order to identify records that include the search feature; and a display module for displaying the plurality of posting lists on a display device.

20. The system of claim 19, wherein the strategy module determines the desired number of the plurality of posting lists based on the size of the storage cache by dividing an available size of the storage cache by an allowed size for each one of the posting lists.

21. The system of claim 20, wherein the allowed size of each of the plurality of posting lists ranges between approximately 512 B and 64 KB.

22. The system of claim 19, wherein the index insert module generates the plurality of posting lists by mapping multiple features randomly to the merged posting list.

23. The system of claim 22, wherein the multiple features mapped to the merged posting list comprise the features that occur infrequently in the processed records.

24. The system of claim 22, wherein the multiple features mapped to the merged posting list comprise the features that occur infrequently in queries.

25. The system of claim 22, wherein the multiple features mapped to the merged posting list are determined based on a hash of the multiple features.

26. The system of claim 19, wherein the plurality of posting lists are stored in WORM storage.

27. The system of claim 19, further comprising a statistics manager for updating statistics associated with the records processed.

28. The system of claim 19, further comprising;
a query runtime module for parsing the query in order to extract a feature; and
a statistics manager for updating statistics associated with the received queries.

29. The system of claim 19, wherein the index insert module generates an index structure that includes the entries in the plurality of posting lists; and
wherein the query runtime module looks up the index structure.

30. A computer-implemented system for providing an index to enable searching of records, the system comprising:
an index insert module including a computer processor for generating an index structure for an increasing sequence of record identifiers and index features;

a generation module for generating posting lists with the record identifiers and frequency of the index features;

a merge module for creating a merged posting list by moving posting lists smaller than one block into combined posting lists for reducing the size of the index with a reduction in the number of the posting lists;

a search module for searching the combined posting lists in response to a query searching the records;

the index insert module inserting an identifier for a new record into the index structure beginning at a root node of the index structure by comparing the identifier of the new record and a reference identifier at the root node of the index structure;

upon a determination by the index insert module that inserting the identifier of the new record is unsuccessful, the index insert module identifies a target node in the index structure based on a jump pointer that points to a target node, and recursively repeats the insertion of the identifier of the new record starting at the target node, until the identifier of the new record is successfully inserted into the index structure; and a display module for displaying the combined posting lists on a display device.

31. The system of claim 30, wherein the inserted identifier is not relocated and the path through the index structure to the identifier is immutable.

32. The system of claim 30, further comprising the index insert module generating a new node if the target node does not exist and updating a jump pointer to point to the new node.

33. The system of claim 30, wherein the jump pointer is identified using a mathematical difference between the identifier and the reference identifier of a current node.

34. The system of claim 30, wherein the jump pointer is identified using a logarithm of a mathematical difference between the identifier and the reference identifier of a current node.

35. The system of claim 30, wherein the reference identifier is a largest identifier stored in the root node.

36. The system of claim 30, wherein the index structure is tree-like.

37. A computer product for providing an inverted index to enable searching of records, the computer program product comprising:
a computer readable storage medium having computer readable program code embodied therewith, the computer readable program code comprising:
computer readable program code configured to process the records to identify features for indexing in the inverted index;
computer readable program code configured to generate a plurality of posting lists from the records, wherein each of the posting lists corresponds to at least one of the identified features;
computer readable program code configured to maintain in a storage cache a tail block of at least one of the plurality of posting lists to minimize random Input/Output to the inverted index;
computer readable program code configured to create a merged posting list by moving posting lists smaller than one cache block into a combined posting list for reducing the size of the inverted index with a reduction in the plurality of posting lists;

computer readable program code configured to store the plurality of posting lists in a write-once-read-many (WORM) storage;

computer readable program code configured to store tail blocks removed from the storage cache into one of the plurality of posting lists in the WORM storage;

computer readable program code configured to maintain an encoding of the identified features for the inverted index and a record identifier in each entry of the merged posting list;

computer readable program code configured to determine a desired number of the plurality of posting lists based on a desired level of any of an insertion performance, a query performance, and a size of the storage cache;

computer readable program code configured to receive a query that includes a search feature;

computer readable program code configured to rank records in the plurality of posting lists for answering the query to the plurality of posting lists;

computer readable program code configured to read a posting list corresponding to the search feature in the query, in order to identify records that include the search feature; and computer readable program code configured to display the plurality of posting lists on a display device.

38. A computer product for providing an index to enable searching of records, the computer program product comprising:

a computer readable storage medium having computer readable program code embodied therewith, the computer readable program code comprising:

computer readable program code configured to generate an index structure for an increasing sequence of record identifiers and index features;

computer readable program code configured to generate posting lists with the record identifiers and frequency of the index features;

computer readable program code configured to create a merged posting list by moving posting lists smaller than one block into combined posting lists for reducing the size of the index with a reduction in the number of the posting lists;

computer readable program code configured to search the combined posting lists in response to a query searching the records;

computer readable program code configured to insert an identifier for a new record into the index structure beginning at a root node of the index structure by comparing the identifier of the new record and a reference identifier at the root node of the index structure; and upon a determination that inserting the identifier of the new record is unsuccessful, computer readable program code identifies a target node in the index structure based on a jump pointer that points to the target node, and recursively repeats the insertion of the identifier of the new record starting at the target node, until the identifier of the new record is successfully inserted into the index structure; and computer readable program code configured to display the combined posting lists on a display device.

* * * * *